United States Patent
Chung et al.

(10) Patent No.: US 12,459,456 B2
(45) Date of Patent: Nov. 4, 2025

(54) MULTI-SENSOR BODY MEASUREMENT DETECTION AND RESTRAINT CONTROL

(71) Applicant: MAGNA ELECTRONICS, LLC, Southfield, MI (US)

(72) Inventors: Caroline Chung, Royal Oak, MI (US); Matthew Parker, Nashua, NH (US); Varun Garg, Winchester, MA (US); Riley Paxton, Pontiac, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 44 days.

(21) Appl. No.: 18/411,530

(22) Filed: Jan. 12, 2024

(65) Prior Publication Data

US 2025/0229739 A1   Jul. 17, 2025

(51) Int. Cl.
| | |
|---|---|
| *B60R 21/015* | (2006.01) |
| *B60N 2/00* | (2006.01) |
| *G01S 13/86* | (2006.01) |

(52) U.S. Cl.
CPC ...... *B60R 21/01538* (2014.10); *B60N 2/0025* (2023.08); *B60R 21/01552* (2014.10); *G01S 13/865* (2013.01); *G01S 13/867* (2013.01)

(58) Field of Classification Search
CPC ........ B60R 21/01538; B60R 21/01552; B60R 21/01536; B60N 2/0025; G01S 13/865; G01S 13/867
See application file for complete search history.

(56) References Cited

U.S. PATENT DOCUMENTS

| | | | | |
|---|---|---|---|---|
| 5,118,134 A | * | 6/1992 | Mattes | G01P 3/68 |
| | | | | 280/735 |
| 5,626,359 A | * | 5/1997 | Steffens, Jr. | B60R 21/01558 |
| | | | | 280/735 |
| 5,653,462 A | * | 8/1997 | Breed | B60N 2/2863 |
| | | | | 180/272 |
| 6,757,602 B2 | | 6/2004 | Breed et al. | |
| 7,415,126 B2 | | 8/2008 | Breed et al. | |
| 10,349,032 B2 | * | 7/2019 | Jemander | B60K 28/06 |
| 2002/0003345 A1 | * | 1/2002 | Stanley | B60R 21/01532 |
| | | | | 280/728.1 |
| 2006/0208169 A1 | * | 9/2006 | Breed | G01S 15/88 |
| | | | | 250/221 |

(Continued)

OTHER PUBLICATIONS

International Search Report and Written Opinion for International Application No. PCT/US2025/010265 mailed May 2, 2025.

*Primary Examiner* — George C Jin

(57) ABSTRACT

A camera measurement module is configured to determine first measurements of an occupant of a seat based on an image captured using a camera within the passenger cabin of the vehicle. A radar measurement module is configured to determine second measurements of the occupant of the seat within the passenger cabin of the vehicle based on radar signals from a radar sensor, A measurement module is configured to determine third measurements of the occupant of the seat within the passenger cabin based on at least one of: the first measurements of the occupant of the seat; and the second measurements of the occupant of the seat. An actuator control module is configured to selectively actuate an actuator of a restraint associated with the seat based on the one or more third measurements of the occupant of the seat.

20 Claims, 10 Drawing Sheets

(56) References Cited

U.S. PATENT DOCUMENTS

| | | |
|---|---|---|
| 2019/0303729 A1 | 10/2019 | Gramenos et al. |
| 2023/0168364 A1 | 6/2023 | Podkamien et al. |
| 2023/0280204 A1* | 9/2023 | Wu .................... G01G 19/50 |
| | | 177/1 |

* cited by examiner

| Occupant Id | Weight (lb) | Height | Gender |
|---|---|---|---|
| 1 | 108 lb | 5ft 2in | F |
| 2 | 116 lb | 5ft 2in | F |
| 3 | 160 lb | 5ft 8in | M |
| 4 | 165 lb | 5ft 8in | M |
| 5 | 200 lb | 5ft 6in | F |
| 6 | 210 lb | 5ft 7in | M |
| 7 | 285 lb | 5ft 2in | F |
| 8 | 290 lb | 6ft 2in | M |
| 9 | 255 lb | 6ft 11in | M |
| 10 | 298 lb | 5ft 6in | M |

FIG. 8

MULTI-SENSOR BODY MEASUREMENT DETECTION AND RESTRAINT CONTROL

FIELD

The present disclosure relates to in passenger cabin monitoring systems and methods for vehicles and more particularly to body measurement detection and restraint control using multiple different inputs.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles can be used for individual use (e.g., by the same one or more people) or for shared use by many different people. Rideshare systems allow users to request transportation from a pick-up location to a drop-off location.

Vehicles may be human-operated or autonomous vehicles (e.g., cars, vans, buses, bicycles, motorcycles, etc.). Examples of autonomous vehicles include semi-autonomous and fully autonomous vehicles. Human operated vehicles are controlled by a human using input devices, such as a steering wheel, an accelerator pedal, and a brake pedal. Some vehicles may be remotely controlled under some circumstances.

SUMMARY

In a feature, an occupant classification system of a vehicle includes: a camera measurement module configured to determine one or more first measurements of an occupant of a seat within a passenger cabin of the vehicle based on an image captured using a camera within the passenger cabin of the vehicle; a radar measurement module configured to determine one or more second measurements of the occupant of the seat within the passenger cabin of the vehicle based on radar signals from a radar sensor within the passenger cabin of the vehicle; a measurement module configured to determine one or more third measurements of the occupant of the seat within the passenger cabin based on at least one of: the one or more first measurements of the occupant of the seat; and the one or more second measurements of the occupant of the seat; and an actuator control module configured to selectively actuate an actuator of a restraint associated with the seat based on the one or more third measurements of the occupant of the seat.

In further features, the measurement module is configured to determine the one or more third measurements of the occupant of the seat based on both of the one or more first measurements and the one or more second measurements.

In further features, the measurement module is configured to determine the one or more third measurements of the occupant of the seat based on one or more averages of the one or more first measurements and the one or more second measurements, respectively.

In further features, the measurement module is configured to determine the one or more third measurements of the occupant further based on first and second confidence values of the camera and radar measurement modules, respectively.

In further features, the measurement module is configured to set the one or more third measurements to the one or more first measurements when the first confidence value is greater than the second confidence value.

In further features, the measurement module is configured to set the one or more third measurements to the one or more second measurements when the second confidence value is greater than the first confidence value.

In further features, the measurement module is configured to determine the one or more third measurements of the occupant of the seat based on one or more weighted averages of the one or more first measurements and the one or more second measurements, respectively.

In further features, the measurement module is configured to set one or more first weight values for the one or more first measurements based on the first confidence value and to set one or more second weight values for the one or more second measurements based on the second confidence value.

In further features, the measurement module is configured to increase the one or more first weight values as the first confidence value increases.

In further features, the measurement module is configured to decrease the one or more first weight values as the first confidence value decreases.

In further features, the first, second, and third measurements include a weight of the occupant.

In further features, the first, second, and third measurements include a height of the occupant.

In further features, the camera is a time of flight camera.

In further features, the restraint is an air bag.

In further features, a keypoint module is configured to determine keypoints of the occupant based on the image captured using the camera, where the camera measurement module is configured to determine the one or more first measurements of an occupant of a seat within a passenger cabin of the vehicle based on at least two of the keypoints of the occupant.

In further features, the radar measurement module is configured to determine the one or more second measurements of the occupant of the seat within the passenger cabin of the vehicle based on an average of a sum of energies of the radar signals from the radar sensor.

In further features, a learning module is configured to selectively adjust one or more parameters of the camera measurement module based on one or more differences between the one or more first measurements and the one or more second measurements.

In further features, a learning module is configured to selectively adjust one or more parameters of the radar measurement module based on one or more differences between the one or more first measurements and the one or more second measurements.

In further features, the actuator control module is configured to actuate the actuator of the restraint associated with the seat based on the one or more third measurements of the occupant of the seat when a collision condition of the vehicle with an object is detected.

In a feature, an occupant classification method includes: determining one or more first measurements of an occupant of a seat within a passenger cabin of a vehicle based on an image captured using a camera within the passenger cabin of the vehicle; determining one or more second measurements of the occupant of the seat within the passenger cabin of the vehicle based on radar signals from a radar sensor within the passenger cabin of the vehicle; determining one or more third measurements of the occupant of the seat within the passenger cabin based on at least one of: the one or more first measurements of the occupant of the seat; and the one or more second measurements of the occupant of the seat; and selectively actuating an actuator of a restraint associated with the seat based on the one or more third measurements of the occupant of the seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8 includes an example table of heights, weights, and genders (male or female) of the occupants of FIG. 7;

In the drawings, reference numbers may be reused to identify similar and/or identical elements.

DETAILED DESCRIPTION

Drivers and other occupants of vehicles have bodies of different heights and weights. One or more features of a vehicle may be controlled based on the height and weight of an occupant of a vehicle. For example, airbag deployment force and/or timing for a seat may be set based on the height and/or weight of the occupant of that seat.

The present application involves systems and methods for determining occupant height and weight using input from more than two in passenger cabin sensors, such as images from a camera and input from a radar sensor. This increases the accuracy and reliability of the determined height and weight measurements. Feature control based on occupant height and/or weight is therefore also increased in terms of accuracy and reliability.

Figure 1:
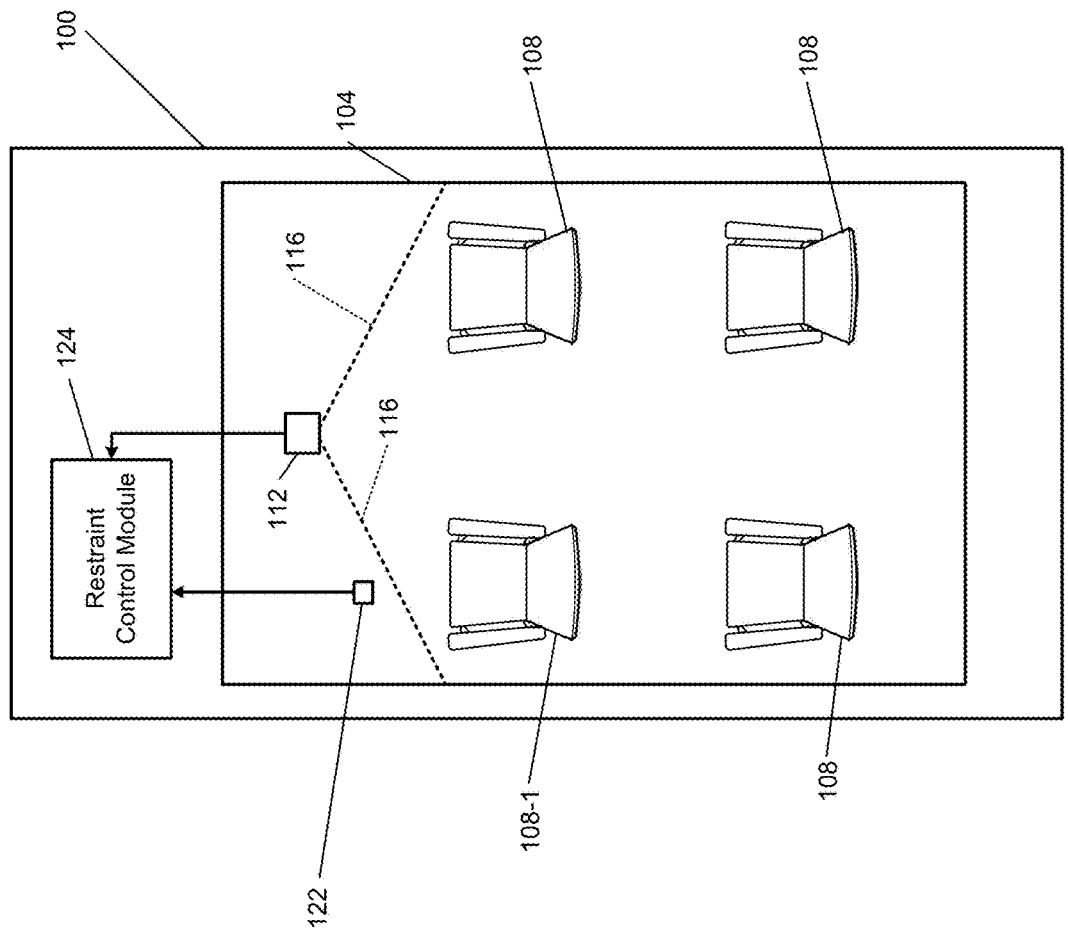
FIGS. 1-3 are functional block diagrams of example systems of a vehicle.

FIG. 1 is a functional block diagram of an example system of a vehicle 100. The vehicle 100 includes a passenger cabin 104. The vehicle 100 also includes one or more propulsion devices, such as one or more electric motors and/or an engine. The vehicle 100 may include a transmission and/or other types of gearing devices configured to transfer torque to one or more wheels of the vehicle 100 from the engine and/or the electric motor(s).

One or more seats 108 are located within the passenger cabin 104. Occupants of the vehicle 100 may sit on the seats 108. While the example of the vehicle 100 including four seats is provided, the present application is also applicable to greater and lesser numbers of seats. The vehicle 100 may be a sedan, a van, a truck, a coupe, a utility vehicle, boat, airplane, or another suitable type of land, air, or water based vehicle. The present application is also applicable to the vehicle 100 being a public transportation vehicle, such as a bus, a train, tram, street car, or another suitable form of transportation.

A driver sits on a driver's seat, such as 108-1. A driver may actuate an accelerator pedal to control acceleration of the vehicle 100. The driver may actuate a brake pedal to control application of brakes of the vehicle 100. The driver may actuate a steering wheel to control steering of the vehicle 100. In various implementations, the vehicle 100 may be an autonomous vehicle or a semi-autonomous vehicle. In autonomous vehicles and semi-autonomous vehicles, acceleration, braking, and steering may be at least at times controlled by one or more control modules of the vehicle 100.

A camera 112 is disposed to capture images including eyes, heads, faces, and upper torsos of users (occupants) of the vehicle 100, such as the driver. The camera 112 has a predetermined field of view (FOV). An example FOV is illustrated by 116 in FIG. 1. The driver's seat (e.g., 108-1) is disposed within the predetermined FOV of the camera 112. One or more of the seats 108 may also be located within the predetermined FOV of the camera 112. In various implementations, the camera 112 may be disposed on the vertical top of a steering wheel. The camera 112 may be a time of flight (ToF) camera or another suitable type of camera. In various implementations, the camera 112 may include a depth component, such as a red green blue depth (RGB-D) camera.

Figure 2:
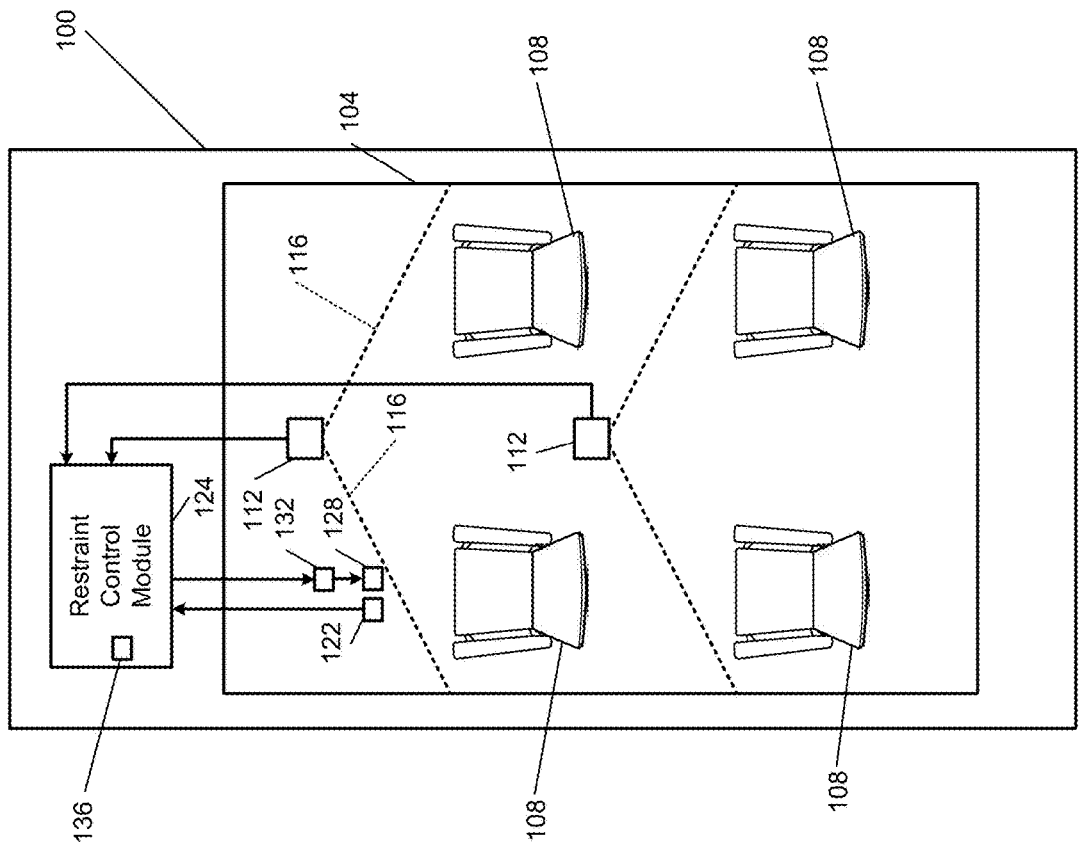
Figure 3:
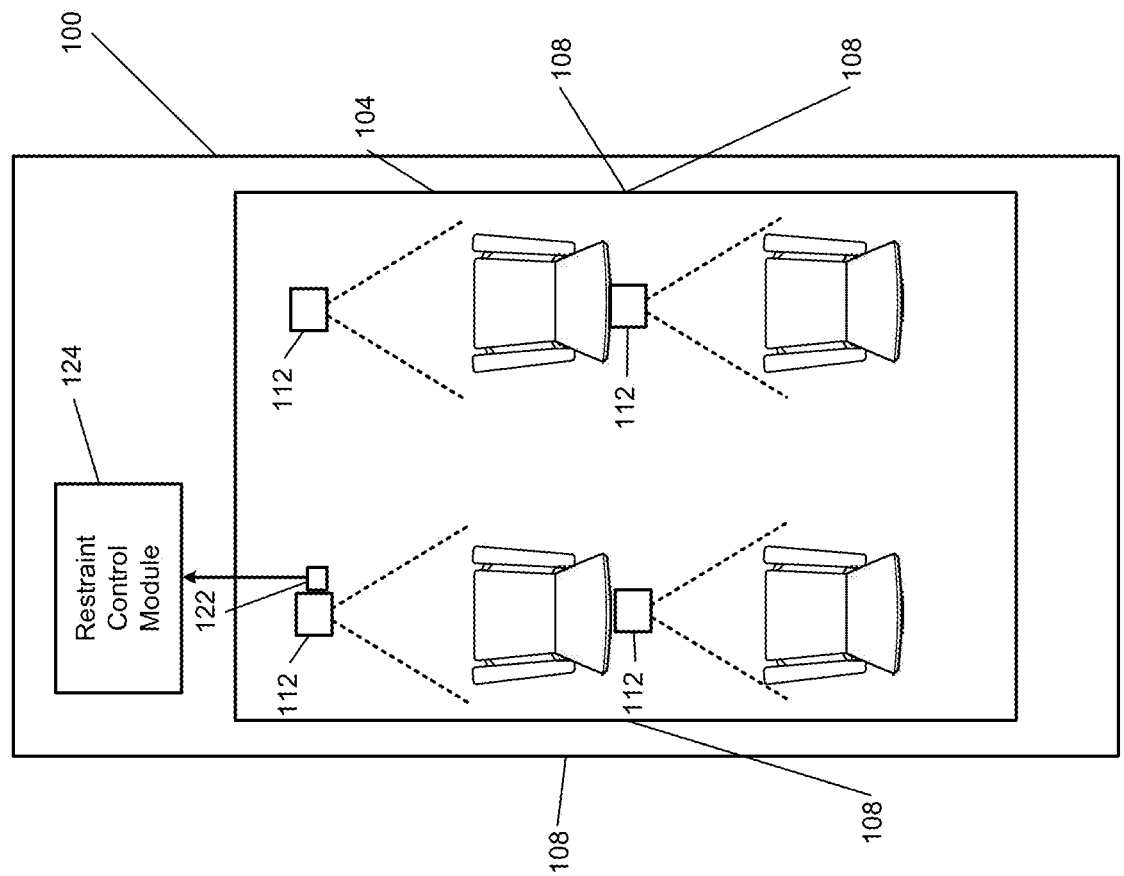

While the example of one camera is provided, one camera may capture images of users in front seats of the vehicle, and one camera may capture images of users in rear seats of the vehicle 100, such as shown in the example of FIG. 2. Alternatively, one camera may be provided per seat to capture images of users in that seat, such as shown in the example of FIG. 3.

In various implementations one or more other cameras may be included, for example, to detect and locate users, heads, faces, eyes, etc. While the example of passengers sitting in seats is provided, the present application is also applicable to passengers that are standing and in other orientations in vehicles, such as having feet within footwells.

One or more other types of sensors are also included. For example, a radar sensor 122 may also be included. The radar sensor 122 may output radar signals toward the driver's seat (e.g., 108-1) and receive signals reflected back to the radar sensor 122. One or more parameters of the driver (e.g., height and weight) may be determined based on the received signals. The radar sensor may be, for example, a 77 gigahertz radar sensor or have one or more other suitable frequencies, such as between 57-64 GHz. In various implementations, one radar sensor may be provided per seat (e.g., like the cameras 112 in the example of FIG. 3) or per row (e.g., like the cameras 112 in the example of FIG. 2.), or for the entire vehicle (e.g., like the camera 112 in the example of FIG. 1).

A restraint control module 124 controls deployment of restraints of the vehicles, such as when a collision of the vehicle is detected. An example restraint 128 is illustrated in FIG. 2 in association with the driver's seat 108. One or more restraints may be provided for each seat. Examples of restraints include air bags and other types of restraints.

A restraint actuator 132 actuates the restraint 128 in response to input from the restraint control module 124. The restraint 128 and the restraint actuator 132 are not shown in FIGS. 1 and 3 for simplicity of the drawings but would be included. Also, while only the restraint 128 is shown, one or more restraints may be included per seat. Additional restraints for two or more seats may also be implemented.

The restraint control module 124 controls deployment (e.g., force, timing, etc.) of the restraints of the seats based on at least one of the height and the weight of the occupants on the seats, respectively. As discussed further below, a body module 136 determines the height and the weight of the occupant of a seat based on images from a camera 112 and radar signals from a radar sensor 122. While the body module 136 is illustrated as being within the restraint control module 124, the body module 136 may be implemented separately or in another module.

Figure 4:
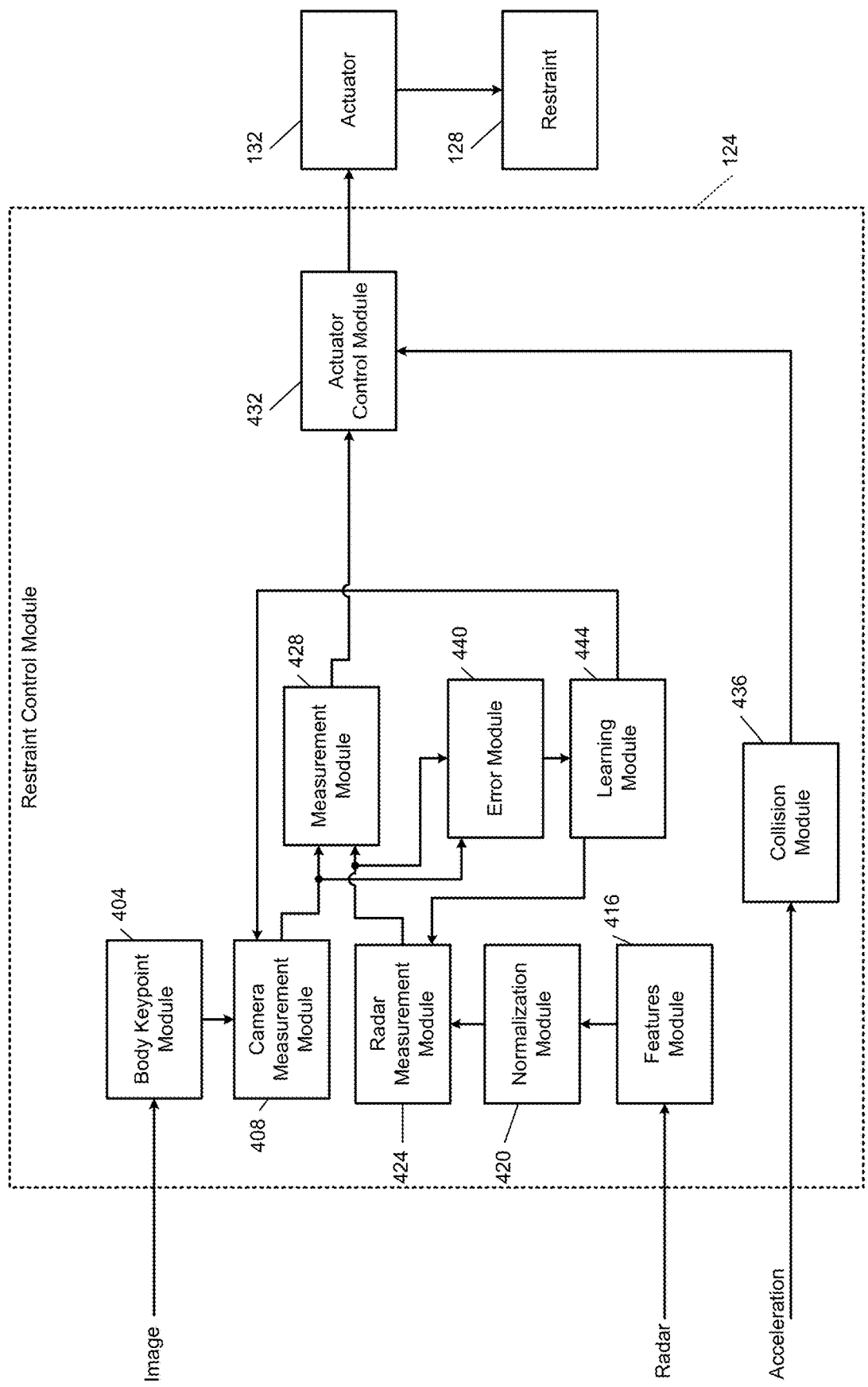
FIG. 4 is a functional block diagram of an example implementation of a restraint control module.
Figure 5:
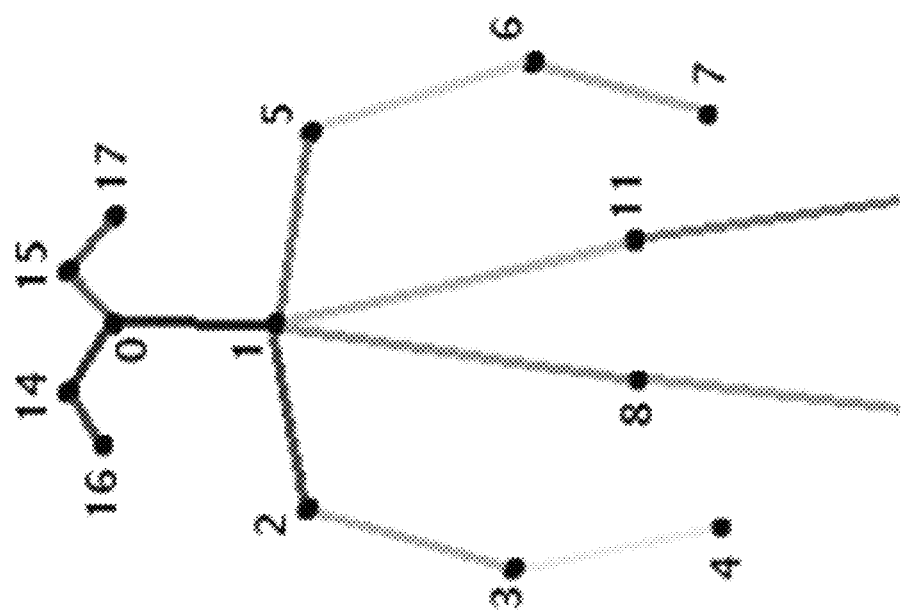
FIG. 5 includes an example illustration of keypoints of a body of a human determined from an image.

FIG. 4 is a functional block diagram of an example implementation of the restraint control module 124. A body keypoint module 404 receives the images from the camera 112. The camera 112 may capture images at a predetermined rate, such as 60 Hertz or at another suitable frequency. The body keypoint module 404 determines keypoints of the body of an occupant of a seat based on the images 112. FIG. 5 includes an example illustration of keypoints of a body of a human determined from an image. In various implementations, the images may be pre-processed (e.g., by a pre-processing module) prior to being used to determine keypoints. The pre-processing may include, for example, removing data regarding moving points and/or other pre-processing. The keypoints may correspond to locations of joints, respectively, of the occupant. The body keypoint module 404 may determine the keypoints from the image, for example, using a keypoint detection algorithm.

A camera measurement module 408 determines body measurements of the occupant based on the keypoints. For example, the camera measurement module 408 may determine a height of the occupant may be determined based on the vertical locations of keypoints 2 and 5 (FIG. 5) of the occupant, such as corresponding to shoulders of the occupant. The camera measurement module 408 may determine the height, for example, using one of a lookup table and an equation that relates keypoint data (e.g., an average vertical height of keypoints 2 and 5) to height.

The camera measurement module 408 may determine a weight of the occupant may be determined based on the horizontal locations of keypoints 2 and 5 and the horizontal locations of keypoints 8 and 11 (FIG. 5) of the occupant, such as corresponding to shoulders and hips of the occupant. For example, the camera measurement module 408 may determine a width of the chest of the occupant based on the horizontal distance between keypoints 2 and 5, such as using an equation or a lookup table that relates horizontal distances to chest widths. The camera measurement module 408 may determine a width of the hips of the occupant based on the horizontal distance between keypoints 8 and 11, such as using an equation or a lookup table that relates horizontal distances to hip widths.

The camera measurement module 408 may determine the weight of the occupant based on the chest width of the occupant and the hip width of the occupant, such as using an equation or a lookup table that relates chest and hip widths to weights.

A features module 416 receives the radar signals from the radar sensor 122. The features module 416 determines features of the body of the occupant of the seat based on the radar signals. Examples of the features include, for example, energy of the received signal at various locations. Locations where signals output by radar sensor 122 reflect back from the occupant may have higher energy than locations where the occupant is not based on the occupant being closer to the radar sensor 122 than other items. In various implementations, the radar signals may be pre-processed (e.g., by a pre-processing module) prior to being used to determine the features. The pre-processing may include, for example, removing data regarding moving points and/or other pre-processing.

A normalization module 420 may normalize the features. For example, the normalization module 420 may normalize (e.g., scale, adjust, etc.) the features for later fusion of information with the body measurements determined based on an image from the camera.

A radar measurement module 424 determines body measurements of the occupant based on the features (with or without normalization). For example, the radar measurement module 424 may determine a height (e.g., a sitting height) of the occupant based on the vertical locations of shoulders of the occupant. These may be, for example, the vertical locations where the energies transition from higher values to lower values. The radar measurement module 424 may determine the height, for example, using one of a lookup table and an equation that relates radar data (e.g., an average vertical height of shoulders) to height.

Figure 6:
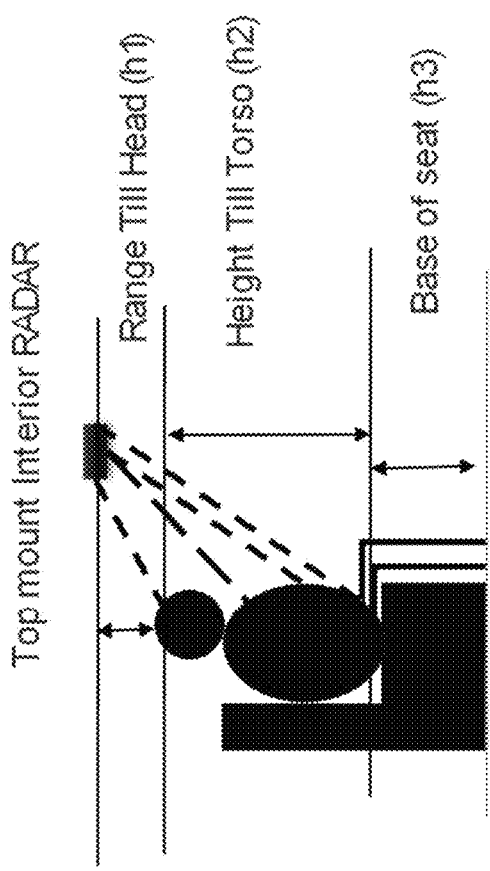
FIG. 6 includes an example illustration of a radar sensor and an occupant of a vehicle.

As illustrated in FIG. 6, in the example of the radar sensor 122 being mounted vertically above the occupant (e.g., on or near a roof of the vehicle), the radar measurement module 424 may determine based on the features the height of the torso of the occupant (h2) and the height of the head of the occupant (h1). The height of the seat upon which the occupant is sitting (h3) may be a predetermined value. The radar measurement module 424 may determine the height of the occupant based on or equal to the height of the torso (h2) plus the height of the head (h1) plus the height of the seat (h3).

The radar measurement module 424 may determine a weight of the occupant may be determined based on the features (with or without normalization). For example, the radar measurement module 424 may determine the weight of the occupant based on an average value of the sum of the energies of signals reflected from by the occupant. The radar measurement module 424 may determine the weight, for example, using one of an equation and a lookup table that relates average values of sums of energies to weights.

Figure 7:
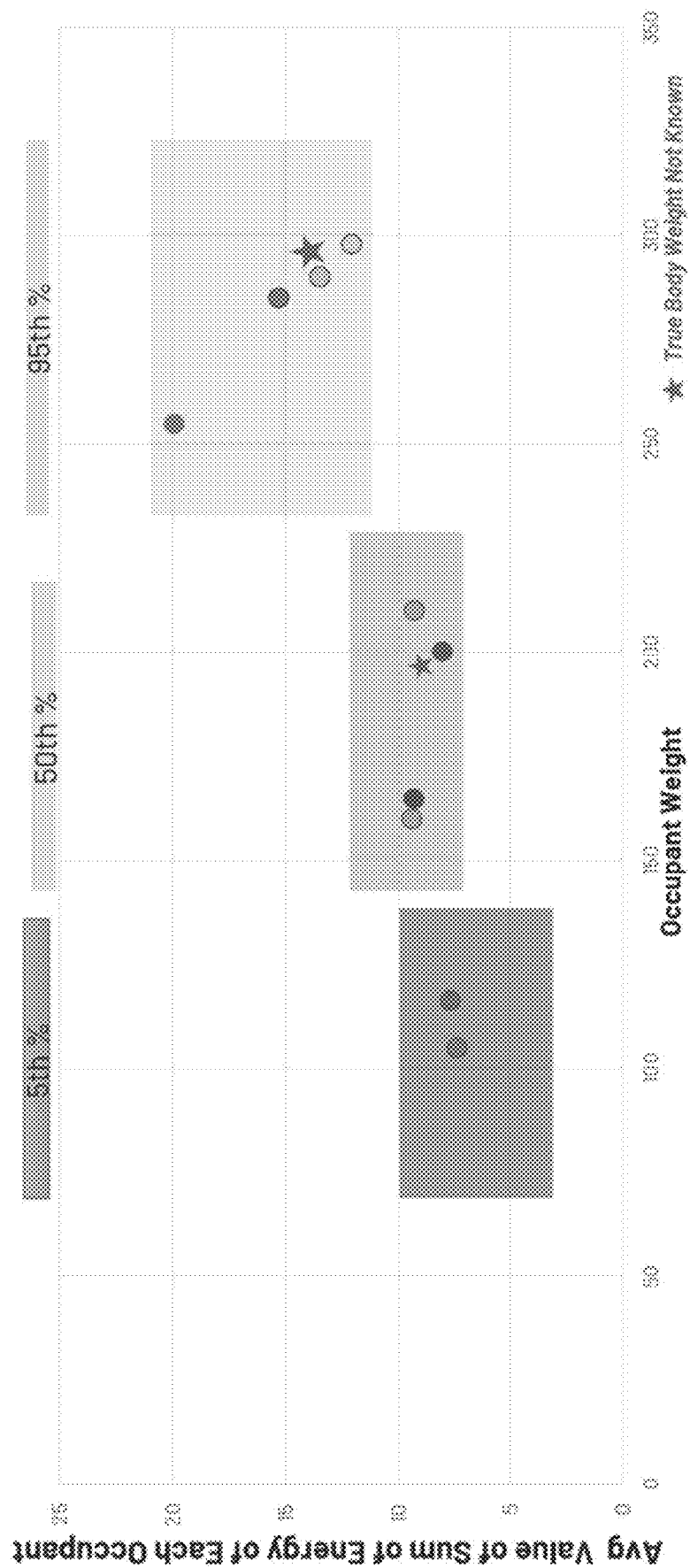
FIG. 7 includes an example graph of occupant weight as a function of average value of sum of energy from doppler Fast Fourier transform (FFT)

FIG. 7 includes an example graph of occupant weight (X axis) as a function of average value of sum of energy (Y axis) from doppler FFT across multiple trials. Each point in FIG. 7 is for a different occupant. For each adult, multiple sets of data were recorded and collected. The average of sum of energy from the doppler FFT may be calculated for each recording. An average of the average from each average for each recording may be determined. FIG. 8 includes an example table of heights, weights, and genders (male or female) of the occupants of FIG. 7. The radar measurement module 424 and the camera measurement module 408 also determine and output indicators of confidence in their respective body measurements. The indicators of confidence may be, for example, values between 0 and 100, where 0 indicates no confidence and 100 indicates complete confidence. The radar and camera measurement modules 424 and 408 may determine their confidences, respectively, based on one or more characteristics of the inputs used to determine their body weights.

A measurement module 428 determines final body measurements (e.g., height, weight, classification (e.g., adult or child), gender (e.g., male or female)) of the occupant based on the body measurements from the camera measurement module 408 and the radar measurement module 424. For example, the measurement module 428 may set the final body measurements based on or equal to averages of the body measurements (e.g., average of heights and average of weights) from the camera and radar measurement modules 408 and 424.

The measurement module 428 may determine the final body measurements of the occupant further based on the confidences. For example, the measurement module 428 may set the final body measurements based on weighted averages the body measurements (e.g., average of heights and average of weights) from the camera and radar measurement modules 408 and 424 and set the weighting values based on the respective confidence values. For example, the measurement module 428 may set the weight to apply to a respective set of body measurements based on the confidence value from that measurement module. For example only, the measurement module 428 may increase the weight applied to the body measurements of the camera measurement module 408 when the confidence of the camera measurement module 408 increases and vice versa. The same may be used for the radar measurement module 424.

As another example, the measurement module 428 may set the final body measurements to one of the body measurements of the camera and radar measurement module 408 and 424 based on the confidences. For example, the measurement module 428 may set the final body measurements based on or to the body measurements of the camera measurement module 408 when the confidence of the camera measurement module 408 is greater than the confidence of the radar measurement module 424. The measurement module 428 may set the final body measurements based on or to the body measurements of the radar measurement module 424 when the confidence of the radar measurement module 424 is greater than the confidence of the camera measurement module 408.

The measurement module 428 may determine the gender of the occupant of the seat based on the final body measurements of the occupant. For example, the measurement module 428 may determine that the occupant is male when the weight and height of the occupant are greater than a predetermined weight and a predetermined height. In various implementations, the gender determination may be omitted or determined in another manner.

The measurement module 428 may determine whether the occupant of the seat is an adult or a child based on the final body measurements of the occupant. For example, the measurement module 428 may determine that the occupant is an adult when the weight and height of the occupant are greater than a predetermined weight and a predetermined height. The measurement module 428 may determine that the occupant is a child when at least one of the weight of the occupant is less than the predetermined weight and the height of the occupant is less than the predetermined height. In various implementations, the determination of whether an occupant is an adult or a child may be omitted or determined in another manner.

The measurement module 428 may determine a body measurement percentile (e.g., bin) for the occupant (e.g., adult) of the seat based on the final body measurements of the occupant. The percentile may be set based on whether the occupant is an adult or a child. For example, the measurement module 428 may set the percentile of the occupant to a $5^{th}$ percentile (e.g., for adults) when the height and/or weight are within a first predetermined height and weight range. An example first predetermined weight range is illustrated in FIG. 7. The measurement module 428 may set the percentile of the occupant to a $50^{th}$ percentile (e.g., for adults) when the height and/or weight are within a second predetermined height and weight range. An example second predetermined weight range is illustrated in FIG. 7. The second predetermined height and weight ranges are greater than the first predetermined height and weight ranges. The measurement module 428 may set the percentile of the occupant to a $95^{th}$ percentile (e.g., for adults) when the height and/or weight are within a third predetermined height and weight range. An example third predetermined weight range is illustrated in FIG. 7. The third predetermined height and weight ranges are greater than the second predetermined height and weight ranges.

When a collision condition of the vehicle is detected, an actuator control module 432 controls actuation (e.g., timing, force, etc.) of the actuator 132 of the restraint 128 based on the final body measurements. For example, the actuator control module 432 may actuate the actuator 132 at a first time after the collision condition is detected and with a first force when the percentile of the occupant is in the $5^{th}$ percentile. The actuator control module 432 may actuate the actuator 132 at a second time after the collision condition is detected and with a second force when the percentile of the occupant is in the $50^{th}$ percentile. The second time may be earlier (after the collision condition is detected) than the first time, and the second force may be greater than the first force. The actuator control module 432 may actuate the actuator 132 at a third time after the collision condition is detected and with a third force when the percentile of the occupant is in the $95^{th}$ percentile. The third time may be earlier (after the collision condition is detected) than the second time, and the third force may be greater than the second force. The examples above may be applicable to both adults and child occupants, but the forces and times may be higher and earlier for adult occupants than child occupants In various implementations, a collision module 436 may detect and indicate the presence of the collision condition of the vehicle. For example, the collision module 436 may detect the presence of the collision condition of the vehicle when one or more accelerations (e.g., lateral, longitudinal) of the vehicle is greater than a predetermined acceleration indicative of a collision of the vehicle with an object. The collision module 436 may not detect the collision condition when the accelerations are less than respective predetermined accelerations. While an example of detecting a collision condition is present, the present application is also applicable to detecting collision conditions based on one or more other parameters.

In various implementations, an error module 440 may determine errors between the body measurements determined by the camera measurement module 408 and the body measurements determined by the radar measurement module 424. For example, the error module 440 may determine a weight error based on a difference (subtraction) between the weight of the occupant determined by the camera measurement module 408 and the weight of the occupant determined by the radar measurement module 424. The error module 440 may determine a height error based on a difference (subtraction) between the height of the occupant determined by the camera measurement module 408 and the height of the occupant determined by the radar measurement module 424.

A learning module 444 may selectively adjust one or more parameters of the camera measurement module 408 based on the weight error and/or the height error. The learning module 444 may adjust the one or more parameters of the camera measurement module 408 to adjust the body measurements of the camera measurement module 408 toward or to the body measurements of the radar measurement module 424, such as when the confidence of the radar measurement module 424 is greater than the confidence of the camera measurement module 408.

The learning module 444 may additionally or alternatively selectively adjust one or more parameters of the radar measurement module 424 based on the weight error and/or the height error. The learning module 444 may adjust the one or more parameters of the radar measurement module 424 to adjust the body measurements of the radar measurement module 408 toward or to the body measurements of the camera measurement module 408, such as when the confidence of the camera measurement module 408 is greater than the confidence of the radar measurement module 424.

Figure 9:
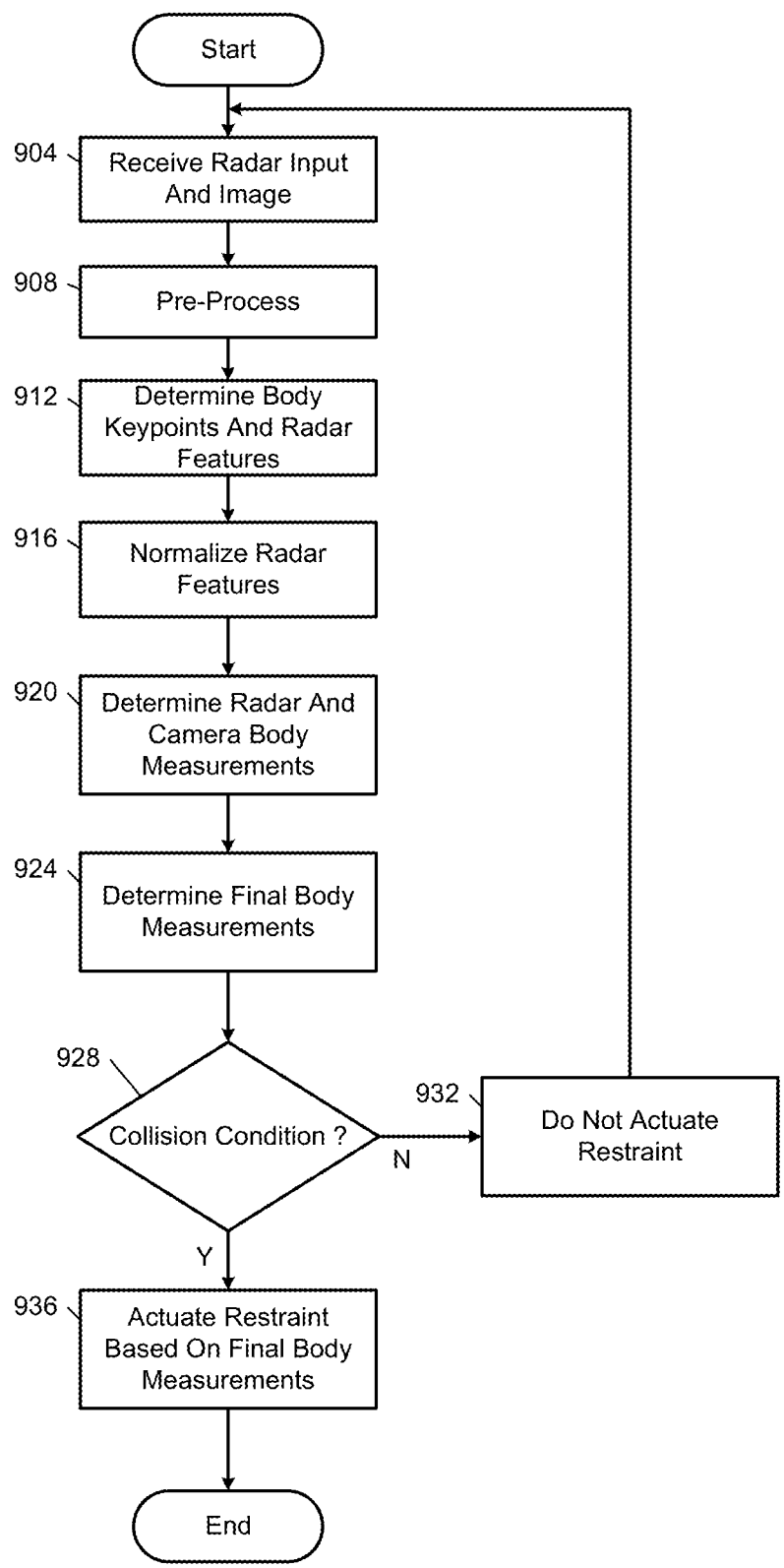
FIG. 9 is a flowchart depicting an example method of controlling actuation of a restraint based on body measurements determined based on from multiple input devices.

FIG. 9 is a flowchart depicting an example method of determining body measurements of an occupant of a seat and controlling actuation of a restraint associated with the seat based on the body measurements of the occupant.

Control may begin with 904 where the features module 416 receives the radar input from the radar sensor 122, and the body keypoint module 404 receives an image from the camera 112. At 908, pre-processing may be performed, or the pre-processing may be performed by the radar sensor 122 and the camera 112 prior to 904.

At 912, the body keypoint module 404 determines the keypoints of the occupant of the seat based on the image. The keypoints may be two dimensional (2D) or three dimensional (3D) keypoints (locations). The features module 416 also determines the features based on the radar input.

At 916, the normalization module 420 normalizes the features, such as for later fusion. At 920, the camera measurement module 408 determines the body measurements of the occupant of the seat based on the keypoints. The radar measurement module 424 determines the body measurements of the occupant based on the radar features.

At 924, the measurement module 428 determines the final body measurements based on at least one of the body measurements determined by the camera measurement module 408 and the body measurements determined by the radar measurement module 424 as discussed above.

At 928, the actuator control module 432 may determine whether one or more collision conditions are present. If 928 is false, the actuator control module 432 does not actuate the actuator 132 of the restraint 128 at 932, and control may return to 904. If 928 is true, the actuator control module 432 actuates the actuator 132 and therefore the restraint 128 (e.g., deploys an air bag associated with the seat) based on final body measurements of the occupant of the seat.

Figure 10:
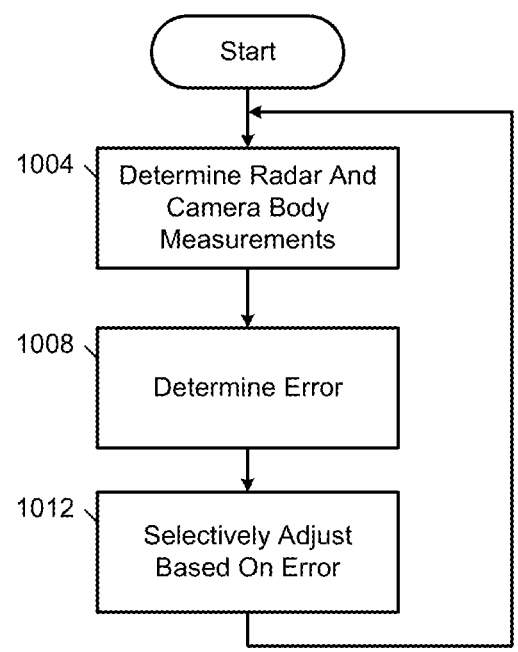
FIG. 10 is a flowchart depicting an example method of learning.

FIG. 10 is a flowchart depicting an example method of learning. Control begins with 1004 where the camera and radar measurement modules 408 and 424 determine the camera and radar body measurements, respectively, as described above. At 1008, the error module 440 determines the error(s) between the camera and radar body measurements. At 1012, the learning module 444 selectively adjusts at least one of the camera measurement module 408 and the radar measurement module 424, such as to reduce one or more of the errors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An occupant classification system of a vehicle, comprising:
    a camera measurement module configured to determine one or more first measurements of an occupant of a seat within a passenger cabin of the vehicle based on an image captured using a camera within the passenger cabin of the vehicle;
    a radar measurement module configured to determine one or more second measurements of the occupant of the seat within the passenger cabin of the vehicle based on radar signals from a radar sensor within the passenger cabin of the vehicle;
    a measurement module configured to determine one or more third measurements of the occupant of the seat within the passenger cabin based on at least one of:
        the one or more first measurements of the occupant of the seat; and
        the one or more second measurements of the occupant of the seat; and
    an actuator control module configured to selectively actuate an actuator of a restraint associated with the seat based on the one or more third measurements of the occupant of the seat,
    wherein the measurement module is configured to determine the one or more third measurements of the occupant of the seat based on both of the one or more first measurements and the one or more second measurements.

2. The occupant classification system of claim 1 wherein the measurement module is configured to determine the one or more third measurements of the occupant of the seat based on one or more averages of the one or more first measurements and the one or more second measurements, respectively.

3. The occupant classification system of claim 1 wherein the measurement module is configured to determine the one or more third measurements of the occupant further based on first and second confidence values of the camera and radar measurement modules, respectively.

4. The occupant classification system of claim 3 wherein the measurement module is configured to set the one or more third measurements to the one or more first measurements when the first confidence value is greater than the second confidence value.

5. The occupant classification system of claim 4 wherein the measurement module is configured to set the one or more third measurements to the one or more second measurements when the second confidence value is greater than the first confidence value.

6. The occupant classification system of claim 3 wherein the measurement module is configured to determine the one or more third measurements of the occupant of the seat based on one or more weighted averages of the one or more first measurements and the one or more second measurements, respectively.

7. The occupant classification system of claim 6 wherein the measurement module is configured to set one or more first weight values for the one or more first measurements based on the first confidence value and to set one or more second weight values for the one or more second measurements based on the second confidence value.

8. The occupant classification system of claim 7 wherein the measurement module is configured to increase the one or more first weight values as the first confidence value increases.

9. The occupant classification system of claim 8 wherein the measurement module is configured to decrease the one or more first weight values as the first confidence value decreases.

10. An occupant classification system of a vehicle, comprising:

a camera measurement module configured to determine one or more first measurements of an occupant of a seat within a passenger cabin of the vehicle based on an image captured using a camera within the passenger cabin of the vehicle;

a radar measurement module configured to determine one or more second measurements of the occupant of the seat within the passenger cabin of the vehicle based on radar signals from a radar sensor within the passenger cabin of the vehicle;

a measurement module configured to determine one or more third measurements of the occupant of the seat within the passenger cabin based on at least one of:

the one or more first measurements of the occupant of the seat; and the one or more second measurements of the occupant of the seat; and an actuator control module configured to selectively actuate an actuator of a restraint associated with the seat based on the one or more third measurements of the occupant of the seat, wherein the first, second, and third measurements include a weight of the occupant.

11. The occupant classification system of claim 1 wherein the first, second, and third measurements include a height of the occupant.

12. The occupant classification system of claim 1 wherein the camera is a time of flight camera.

13. The occupant classification system of claim 1 wherein the restraint is an air bag.

14. The occupant classification system of claim 1 further comprising a keypoint module configured to determine keypoints of the occupant based on the image captured using the camera, wherein the camera measurement module is configured to determine the one or more first measurements of an occupant of a seat within a passenger cabin of the vehicle based on at least two of the keypoints of the occupant.

15. The occupant classification system of claim 1 wherein the radar measurement module is configured to determine the one or more second measurements of the occupant of the seat within the passenger cabin of the vehicle based on an average of a sum of energies of the radar signals from the radar sensor.

16. The occupant classification system of claim 1 further comprising a learning module configured to selectively adjust one or more parameters of the camera measurement module based on one or more differences between the one or more first measurements and the one or more second measurements.

17. The occupant classification system of claim 1 further comprising a learning module configured to selectively adjust one or more parameters of the radar measurement module based on one or more differences between the one or more first measurements and the one or more second measurements.

18. The occupant classification system of claim 1 wherein the actuator control module is configured to actuate the actuator of the restraint associated with the seat based on the one or more third measurements of the occupant of the seat when a collision condition of the vehicle with an object is detected.

19. An occupant classification method comprising:

determining one or more first measurements of an occupant of a seat within a passenger cabin of a vehicle based on an image captured using a camera within the passenger cabin of the vehicle;

determining one or more second measurements of the occupant of the seat within the passenger cabin of the vehicle based on radar signals from a radar sensor within the passenger cabin of the vehicle;

determining one or more third measurements of the occupant of the seat within the passenger cabin based on at least one of:

the one or more first measurements of the occupant of the seat; and the one or more second measurements of the occupant of the seat; and selectively actuating an actuator of a restraint associated with the seat based on the one or more third measurements of the occupant of the seat, wherein the first, second, and third measurements include a height of the occupant.

20. The occupant classification method of claim 19, wherein determining the one or more third measurements includes determining the one or more third measurements of the occupant of the seat based on both of the one or more first measurements and the one or more second measurements.

* * * * *